Nov. 10, 1953  C. W. HARRISON  2,658,548
FORMATION OF WELDING PROJECTIONS ON TUBES
Filed Oct. 25, 1949  4 Sheets-Sheet 2
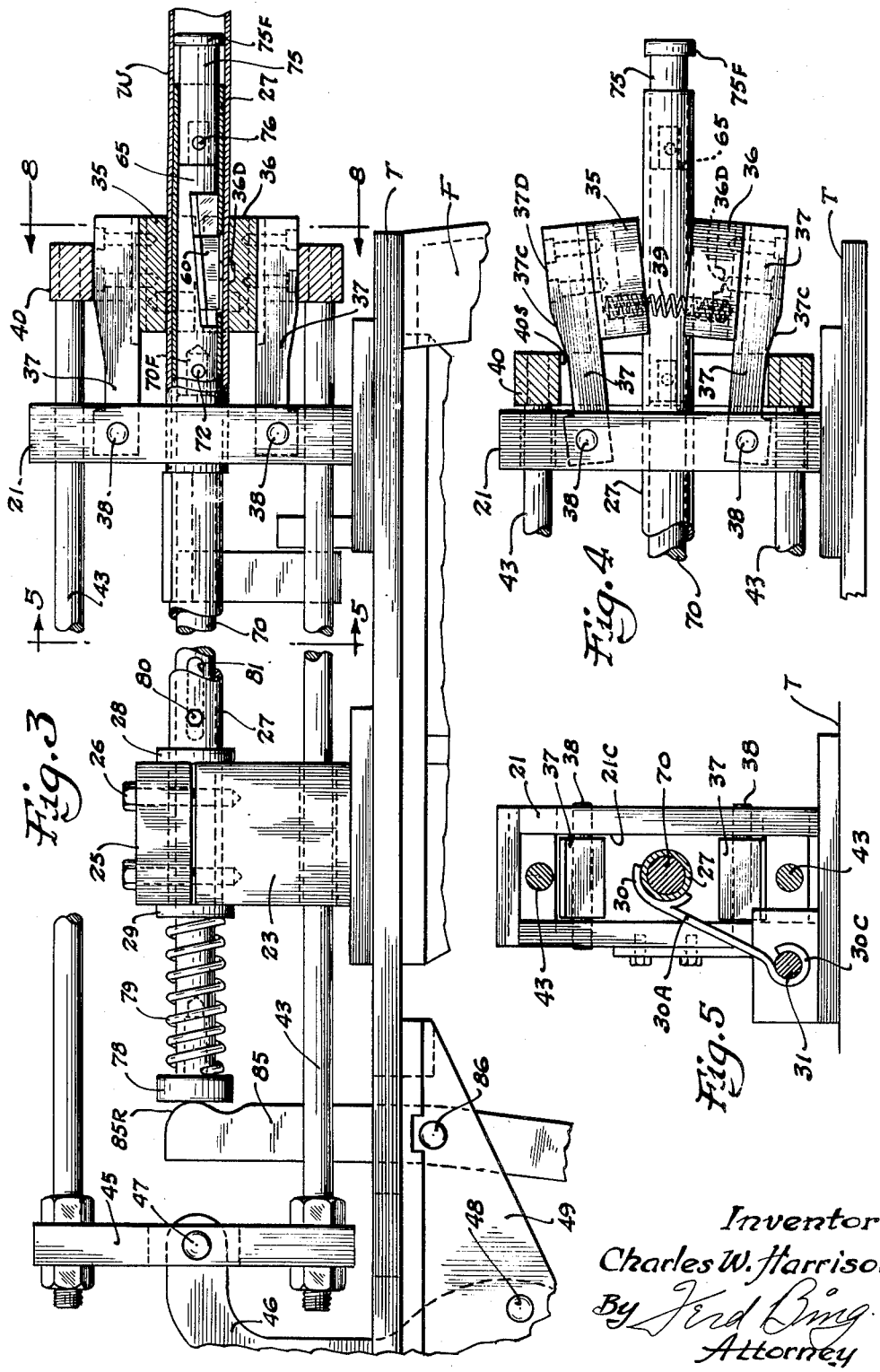

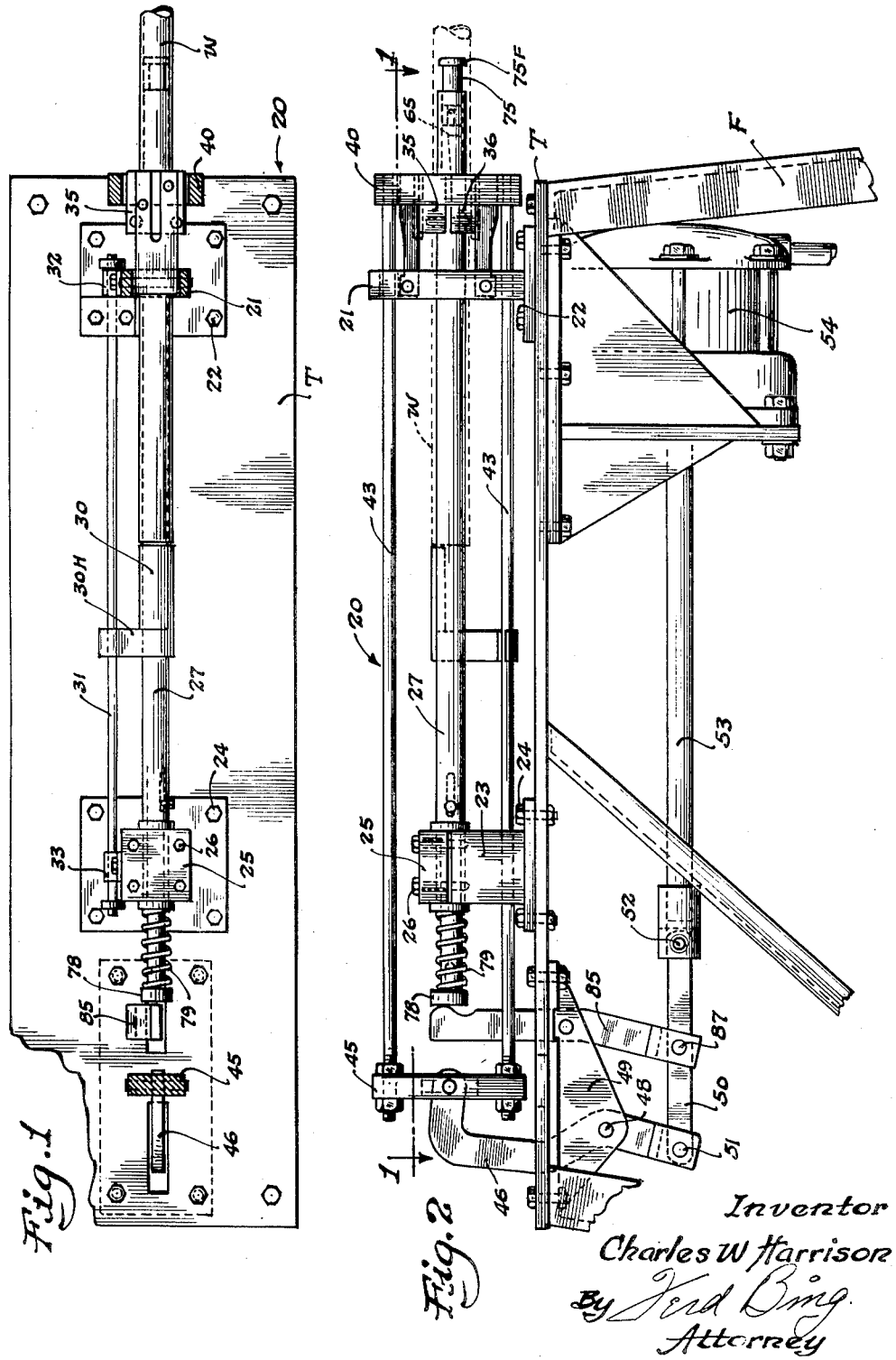

Nov. 10, 1953  C. W. HARRISON  2,658,548
FORMATION OF WELDING PROJECTIONS ON TUBES
Filed Oct. 25, 1949  4 Sheets-Sheet 3
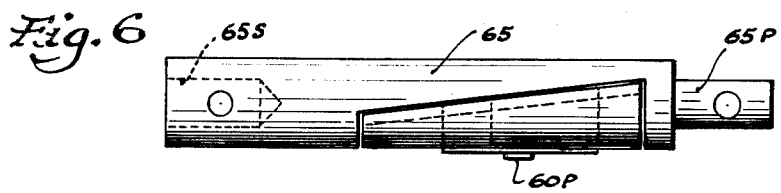
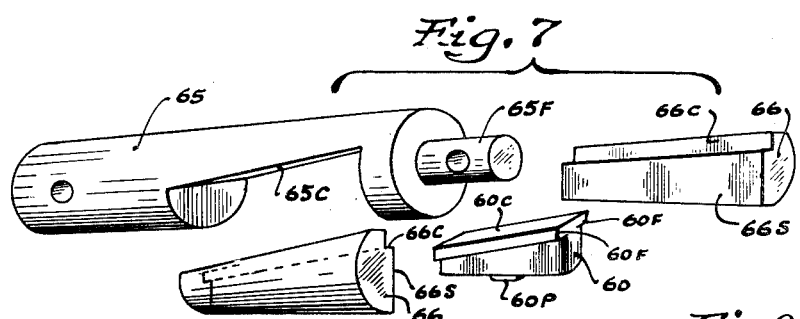
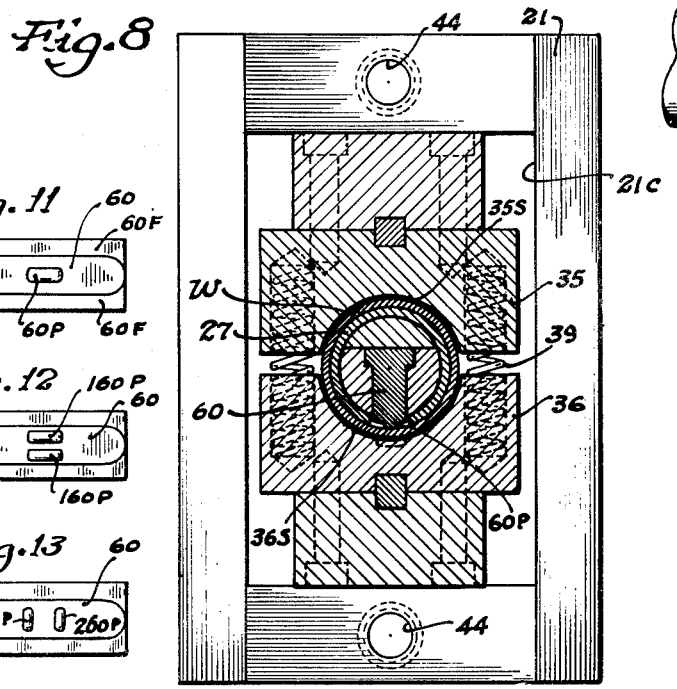
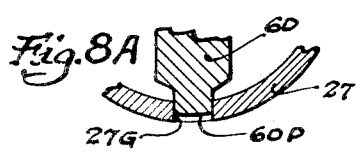
Inventor
Charles W. Harrison
By Ferd Bing
Attorney Nov. 10, 1953 C. W. HARRISON 2,658,548
FORMATION OF WELDING PROJECTIONS ON TUBES
Filed Oct. 25, 1949 4 Sheets-Sheet 4
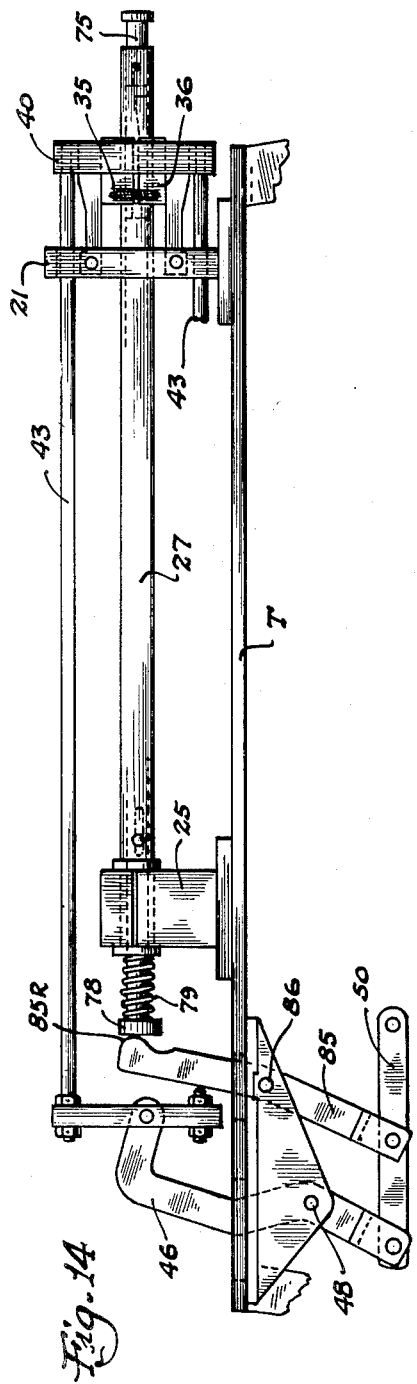
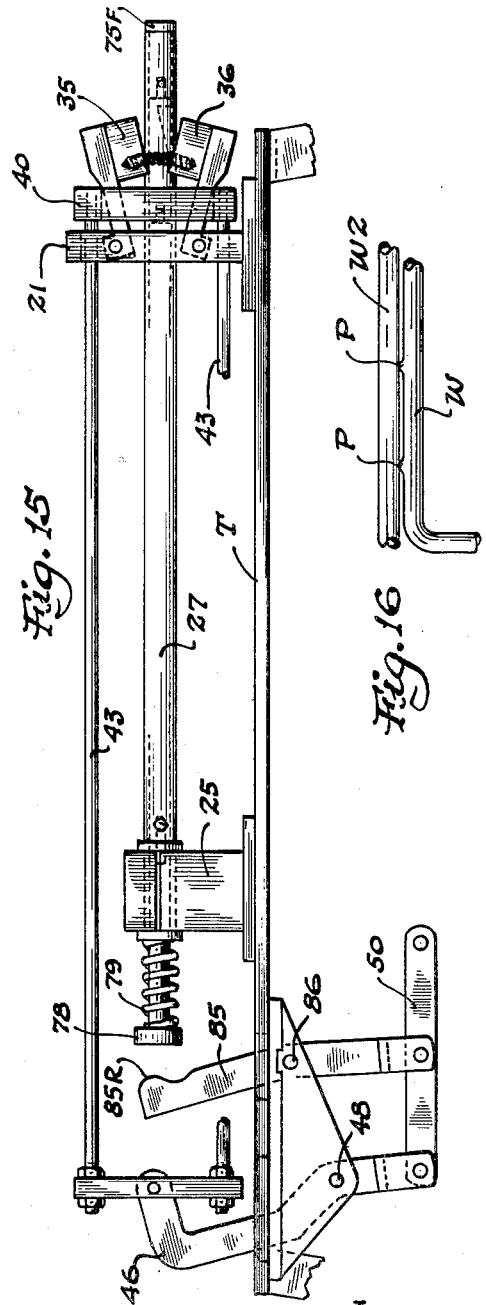
Inventor
Charles W. Harrison
By Fred Bing
Attorney Patented Nov. 10, 1953

2,658,548

UNITED STATES PATENT OFFICE 2,658,548

FORMATION OF WELDING PROJECTIONS ON TUBES

Charles W. Harrison, Warsaw, Ind., assignor to Arnolt Corporation, Warsaw, Ind., a corporation of Indiana Application October 25, 1949, Serial No. 123,384

11 Claims. (Cl. 153—48)

This invention relates to the welding of tubular metallic members to other metallic members such as tubes, and particularly the invention relates to the attainment of welded joints in such instances that are extremely strong and which are neat in appearance.

In the production of tubular metal furniture frames and the like, it has long been the custom to secure the tubular frame members together by welding, and this has been done in the past by ordinary arc welding, which tends to mar the chrome finish that is employed on such tubular members and which also leaves a relatively large body of welding material in an exposed position so that the resulting welded joint is objectionable from the standpoint of appearance. With such welded joints as heretofore used, it has been found that there is a wide variation between the strength of the joints that are produced, primarily due to the fact that it is difficult to judge when a properly welded connection has been established. In view of the foregoing, it is an object of the present invention to simplify the production of welded joints in tubular metal furniture and in other places where the welding of a tubular member to another member is involved, and to accomplish this in such a way that the strength of the joints is uniform, and to enable these joints to be produced in such a way that the finish of the tubular members is not destroyed or marked in any objectionable way. More specifically, it is an object of the present invention to enable tubular members to be welded to other members or to other tubular members by processes of resistance welding, and to enable proper formations on the tubes to be attained in a simple and economical manner to facilitate such resistance welding.

Other and further objects of the present invention will be apparent from the following description and claims and are illustrated in the accompanying drawings, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a plan view of a machine for forming lateral projections on tubular members to adapt such members for resistance welding operations, the view being taken along the line 1—1 of Fig. 2;

Fig. 2 is a fragmentary side elevational view of the machine shown in Fig. 1;

Fig. 3 is an enlarged side elevational view taken partially in longitudinal section;

Fig. 4 is a view similar to Fig. 3 and showing the parts in a different or released position;

Fig. 5 is a transverse sectional view taken substantially along the line 5—5 of Fig. 3;

Fig. 6 is a view of the internal forming die and portions of the actuating mechanism;

Fig. 7 is an exposed perspective view of the structure shown in Fig. 6;

Fig. 8 is a vertical sectional view taken substantially along the line 8—8 of Fig. 3;

Fig. 8A is a fragmentary sectional view showing further details of the structure illustrated in Fig. 8;

Fig. 9 is a fragmentary view of a tubular member after the formation of a lateral projection thereon through the use of the machine of Fig. 1;

Fig. 10 is a transverse sectional view showing the tube of Fig. 9 in position opposite another tube to which it has to be joined by resistance welding;

Figs. 11, 12 and 13 are views showing different forms of punch elements that may be utilized in forming projections on tubes in the present machine;

Fig. 14 is a view illustrating the forming mechanism in its fully actuated position;

Fig. 15 is a view showing the forming mechanism in its released position; and

Fig. 16 is a plan view of a pair of tubular members disposed in opposed relation and illustrating the relationship of the welded joints that may be formed between the parallel tubes.

For purposes of disclosure, the invention is herein illustrated as embodied in a forming machine 20 having a supporting frame F and a table top T upon which the working elements of the machine are mounted. Thus, at the right-hand end of the table top T, an upstanding mounting bracket 21 is mounted by means such as bolts 22, while a substantial distance to the left on the table top T another bearing bracket 23 is supported by means including bolts 24, the bracket 23 having a removable cap portion 25 that is held in position thereon by cap screws 26.

The bearing or mounting bracket 23 serves as a support for a stationary tubular mandrel 27 that has locating collars 28 and 29 thereon so that when the cap 25 is secured in place between the collars 28 and 29, the mandrel 27 is held in a fixed longitudinal position and extends to the right as viewed in Figs. 1 to 3 to a point somewhat to the right of the supporting bracket 21, the bracket 21 having a rectangular opening 21C formed therein as shown in Figs. 5 and 8, so as to enable the mandrel 27 to project therethrough.

When a tubular workpiece such as the tube W is to have a projection P formed thereon, it is put in place by endwise movement on the end of the mandrel 27, and in order that the projection P may be located in the desired endwise position on the tube W, means are afforded in association with the mandrel 27 to limit the endwise mounting movement of the tube W on the mandrel 27. In the present instance such stop means are in the form of a segmental stop member 30 adapted to be engaged with one side of the mandrel 27 in the proper endwise position so that the stop 30 will be engaged by the end of the tube W. The stop 30 is mounted on an arm 30A that extends downwardly and is carried on a horizontally extending mounting rod 31 that is in turn mounted in brackets 32 and 33 that are located adjacent to the brackets 21 and 25, respectively. The mounting of the arm 30A on the rod 31 is accomplished by curling the lower end of the arm 30 about the rod 31 as indicated at 30C in Fig. 5. Thus, the stop 30 may be adjusted along the rod 31 so that the working position of the tubular member W on the mandrel 27 may be adjustably determined.

When a tubular member W is thus in position on the mandrel 27, means that are associated with the mandrel 27 may be rendered effective to form a lateral projection P on the tube W. In providing such means, the present invention affords radially inwardly acting support for the outer surfaces of the tube W while the radially outward forming forces are applied to the tube from the inside thereof. Thus, the outer supporting members take the form of a pair of outer clamp members 35 and 36 that are mounted above and below the mandrel 27 just to the right of the bracket 21. Such mounting is afforded in the present instance by a pair of arms 37 that are pivoted on horizontal axis 38 in the bracket 21 so that such arms extend to the right from the bracket 21 as shown in Figs. 2, 3 and 4 of the drawings. The clamping members 35 and 36 have opposed clamping seats 35S and 36S that may be brought into embracing relationship with respect to the tubular member W when the arms 37 are pivoted from their outer or separated relationships shown in Fig. 4 to their inner or clamping relationships shown in Fig. 3, and it will be noted that a pair of springs 39 act between the members 35 and 36 so as to normally urge the clamping members to their separated relationship of Fig. 4. The lower clamping member 36 in the present instance serves as a die in the formation of the projection P, and for this purpose, a die recess 36D is formed in the clamping member 36 at the position at which the projection P is to be formed.

The clamping members 35 and 36 are actuated from their separated relation of Fig. 4 to their clamped relationship of Fig. 3 by a cam head 40 that has surfaces 40S that are adapted to engage cam surfaces 37C of the arms 37. When the cam head 40 is moved to the right from the position shown in Fig. 4, it engages the surfaces 37C so as to move the arms 37 toward their clamping positions, and after the arms 37 have reached such clamping positions, the right-hand movement of the cam head 40 may be continued so that the surfaces 40S move along dwell surfaces 37D that are formed on the arms 37. The purpose of such additional movement along the dwell surfaces 37D will appear hereinafter.

The cam head 40 is supported and actuated by means including a pair of vertically spaced horizontal rods 43 that extend through bearing openings 44 formed in the bracket 21 above and below the axis of the mandrel 27, the upper rod 43 being extended to the left over and in spaced relationship with respect to the cap 25 of the other bearing bracket 23, while the lower rod 43 extends through a bearing opening in the lower portion of the bracket 23. At their left-hand ends, as shown in Figs. 1 to 3, the two rods 43 are connected together by means including a cross head 45 to which the requisite actuating power is applied by means including a lever 46, the upper end of which is connected by a pivot 47 to the central portion of the cross head 45, while an intermediate portion of the lever 46 is pivoted at 48 on a downwardly extending bracket 49 that is secured to the lower surface of the table top T near the left-hand end thereof. The lower end of the lever 46 is connected to one end of a link 50 at a pivot 51, and this link 50 extends to the right and is pivoted at 52 to one end of a piston rod 53, this piston rod being extended to the right and being associated with the piston of an operating cylinder 54 that may be actuated in opposite directions by means such as pressure air that may be controlled in the usual manner.

After a tube W has been put in position on the mandrel 27, and has been clamped on its outer surfaces by the clamps 35 and 36, means disposed within the mandrel 27 are rendered effective to impart the desired outwardly directed forming forces to the tube W so as to form the projection P thereon. For this purpose, a radially movable punch 60 is mounted within the tubular mandrel 27 for radial movement so that a punch element 60P on the punch 60 may be forced outwardly through a guide opening 27G formed in the mandrel 27 so as to force the material of the tube W into the die recess 36D. In the retracted position of the punch 60, the body of the punch 60 thereof remains in the guide opening 37G, as shown in Fig. 8, thereby to hold the punch 60 against longitudinal shifting movement within the mandrel 27, and this characteristic is utilized in enabling the desired actuating forces to be applied to the punch 60.

Thus, an operating head 65 that is generally cylindrical in form as shown in Figs. 6 and 7 is disposed in a longitudinally slidable relationship within the mandrel 27 near the right-hand or forward end thereof as shown in Fig. 3 of the drawings, and means are afforded on this actuating head 27 so that by longitudinal shifting movement of the head 65, the desired advancing and retracting movements of the punch 60 in a radial direction may be attained. Thus, as is best shown in Figs. 6, 7 and 8, the head 65 is cut away intermediate its ends to afford a sloping cam surface 65C that is adapted to engage an oppositely sloping upper surface 60C that is formed on the punch 60. It will be noted in Figs. 6 and 7 that the surface 60C slopes downwardly to the left so that when the actuating head 65 is moved to the right, the punch 60 will be actuated in an outward radial direction with respect to the axis of the mandrel 27. The surface 65C is, of course, considerably longer than the surface 60C so as to enable such actuating movements to take place.

As will be evident in Figs. 7 and 8, the punch 60 has a generally T-shaped formation when viewed in transverse cross section, so as to afford side flanges 60F along its upper edges, and these flanges 60F are utilized in attaining the desired retracting movement of the punch 60 when the actuating head 65 is moved in a return or right-hand direction after a forming operation has been completed. The flanges 60F are arranged to cooperate with cam grooves 66C that are formed in filler members 66, these filler members 66 being arranged to fit into the recess that is formed when the cam surface 65C is made. When the filler members 66 are thus in place, they complete the cylindrical outline of the member 65 with the exception that a clearance space is afforded between surfaces 66S so that the actuating member 65 may move longitudinally with respect to the punch 60.

The left-hand end of the cylindrical member 65 has a socket 65S formed therein to receive the reduced right-hand end portion 70E of an operating rod 70, this rod being extended through the mandrel 27 and having the end portion 70E connected to the member 65 by a pin 72 as indicated in Fig. 3. At its right-hand end the actuating head 65 has a projecting pin 65P that serves as a mounting for a stop head 75, this stop head being of such a diameter as to ride slidably within the right-hand end portion of the mandrel 27, and having an enlarged flange 75F that, by engagement with the right-hand end of the mandrel 27, will serve as a limiting means insofar as left-hand or return movement of the piston rod 70 may be concerned. The stop head 75 is mounted on the pin 65P by the provision of a socket in the head 75 to embrace the pin 65P, and a transverse pinned connection 76 is afforded between these two parts.

The rod 70 extends to the left beyond the bracket 23, and an enlarged head 78 is fixed on the left-hand end of the rod 70. An expansive coil spring 79 acts between the collar 29 and the head 78 to urge the rod 70 to the left or in a return direction, and in such movements, the rod 70 is held in the desired rotative relationship by means of a transverse guide pin 80 that extends through the mandrel 27 just to the right of the bracket 23, the rod 70 being provided with an elongated slot 81 to enable the rod to move longitudinally while at the same time cooperating with the pin 80 to maintain the desired rotative relationship.

The rod 70 is positively actuated in a right-hand direction by means including a rocking lever 85 that has a rounded upper end 85R that is adapted to engage and impart right-hand actuating force to the head 78. The lever 85 extends downwardly through the table top T and is pivoted intermediate its ends at 86 on the bracket 49, the lower end of the lever 85 being pivoted at 87 on the link 50 so that the lever 85 is actuated in timed relation to the lever 46 by the operating cylinder 54.

As will be evident in Figs. 14 and 15, the levers 46 and 85, although operated in unison, are effective to operate the clamping members 35 and 36 and the actuating head 65 in proper timed relationship. Thus, when the piston rod 53 is in its right-hand position of Fig. 15, the upper end portion 85R is spaced from the head 78, and because of this the first movement of the lever 85 in an operating or clockwise direction will be what may be termed an idle movement. Thus, during such idle movement, the lever 46 is effective to move the cam head 40 along the cam surface 37C so as to thereby move the clamping heads 35 and 36 into their effective positions of Fig. 3, and when this has been accomplished, the portion 85R of the lever 85 engages the head 78 of the piston rod 70 so as to start the actuation of the punch 60. During such actuation, the cam head 40 moves along the dwell surfaces 37D of the arms 37 so as to maintain the clamping heads 35 and 36 in their clamping relationship as the forming operation takes place. When the forming operation has been completed, the cylinder 54 is reversed and the levers 46 and 85 are retracted or moved to the position shown in Fig. 15. As this occurs, the spring 79 returns the operating rod 70 so as to withdraw the punch 60, and after this has taken place, the cam head 40 moves down off of the cam surface 37C so that the springs 39 may separate the clamping heads 35 and 36. The tube W may then be removed from the machine, or may be shifted to another longitudinal position of the formation of another projection P thereon.

The punch element 60 may, of course, be constructed so that more than one projection P is formed on the tube in a single operation of the punch, and such change in formation may also be such as to dispose the projections in a different relationship in respect to the tubular member. Thus, in Fig. 11, the end face of the punch 60 is shown with a single punch element 60P formed thereon so as to extend longitudinally of the punch element, and with this arrangement the projection P is elongated in a direction parallel to the direction of the axis of the tube W. If desired, the punch 60 may take the form shown in Fig. 12 in which a pair of elongated punch elements 160P are formed on the punch 60, these elements being extended longitudinally and in a laterally spaced relationship. When this arrangement is utilized, the die recess 36D will, of course, take a different form so as to cooperate with the two punch elements 160P.

The punch 60 may also take the form shown in Fig. 13 wherein a pair of punch elements 260P are formed on the punch, these punch elements being elongated in a transverse direction so that the projection P will extend transversely rather than in an axial direction. Here again the die recess 36D is modified to conform with the shape of the punch elements 260P.

In the use of the forming apparatus that has thus been described, projections P are formed at longitudinally spaced points on a tubular element W, and where this tube W is to be welded to another tube such as the tube W-2, shown in Fig. 16, the two projections P are placed in engagement with the tube W-2 in the desired relationship. The two tubes are then pressed together by conventional electrode structure and welding current is applied to the tube members W and W-2 in the usual way while the two members are forced toward each other. The projections P are thus heated by resistance and a similar heating takes place in the opposed areas of the tube W-2. As a result, the two tubes become securely welded together, and it has been found in practice that discoloration of the tubes is confined to a relatively small area of the tubes that is located primarily on the two opposed surfaces so that such discoloration is not readily apparent.

From the foregoing description it will be evident that under the present invention projections may be formed on tubes in a simple and expeditious manner, and that through the use of such projections the tubes may be welded to other elements such as other tubes to attain simple and relatively strong joints that are uniform insofar as strength may be concerned. It will also be evident that through the use of the projections as formed by the machine disclosed herein, the production of metal furniture frames is materially simplified and the appearance of the finished furniture frames is greatly improved.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In an apparatus for forming projections on tubular members, a bracket, an elongated hollow mandrel supported at one end on said bracket and projecting therefrom to afford an outboard end onto which such a tubular member may be loaded by endwise mounting movement into a working position in a surrounding and predetermined longitudinal relation on such mandrel, a pair of parallel clamping members pivoted transversely to the longitudinal axis of said mandrel and mounted for shifting movement laterally of said mandrel and near the outboard end thereof and movable between a laterally retracted position and an inner clamping position, an actuating means for shifting the clamping members to clamping position, the retracted position affording clearance for mounting movement of a tubular member, said clamping position being such as to engage said clamping members with the outer surface of such a tubular member, one of said clamping members having a die cavity formed therein so as to be disposed opposite the outer surface of the tubular member, a forming punch mounted within said mandrel for radial movement toward and away from said die cavity, an operating rod extended through said mandrel and toward said outboard end, an actuating means for said operating rod normally out of engagement therewith, means within said mandrel and operated by said rod in longitudinal movements thereof to impart such radial movements to said punch, and common operating means connected to both actuating means, the space between said operating rod and the actuating means therefor providing sufficient clearance, whereby the actuating means for shifting the clamping members into clamping position is operated in advance of the means for actuating the operating rod to advance the punch.

2. In an apparatus for forming projections on tubular members, a bracket, an elongated hollow mandrel supported at one end on said bracket and projecting therefrom to afford an outboard end onto which such a tubular member may be loaded by endwise mounting movement into a working position in a predetermined longitudinal relation on such mandrel, a pair of parallel clamping members pivoted transversely to the longitudinal axis of said mandrel mounted for shifting movement laterally of said mandrel and near the outboard end thereof and movable between a later- ally retracted position and an inner clamping position, an actuating means for shifting said clamping members to clamping position the retracted position affording clearance for mounting movement of a tubular member, and said clamping position being such as to engage said clamping member with the outer surface of such a tubular member, one of the clamping members having a die cavity formed therein so as to be disposed opposite the tubular member, said clamping members being provided with cam surfaces, a forming punch mounted within said mandrel for radial movement toward and away from said die cavity, an actuating means including a member means extended through said mandrel and toward said outboard end and longitudinally shiftable in said mandrel to impart such radial movements to said punch, and common operating means connected to both actuating means, the space between said operating rod and the actuating means therefor providing sufficient clearance, whereby the actuating means for shifting the clamping members into clamping position is operated in advance of the means for actuating the operating rod to advance the punch.

3. In an apparatus for forming projections on tubular members, a bracket, an elongated hollow mandrel supported at one end on said bracket and projecting therefrom to afford an outboard end onto which such a tubular member may be loaded by endwise mounting movement into a working position in a predetermined longitudinal relation on such mandrel, a pair of parallel clamping members pivoted transversely to the longitudinal axis of said mandrel mounted for shifting movement laterally of said mandrel and near the outboard end thereof and movable between a laterally retracted position and an inner clamping position, the retracted position affording clearance for mounting movement of a tubular member, and said clamping position being such as to engage said clamping members with the outer surface of such a tubular member, one of said clamping members having a die cavity formed therein so as to be disposed opposite the tubular member, a forming punch mounted within said mandrel for radial movement toward and away from said die cavity, said mandrel having an elongated longitudinal opening therein adapted to receive said punch and to hold said punch against displacement longitudinally of the mandrel, an operating rod extended through said mandrel and toward said outboard end, an actuating means for said operating rod, cam means within said mandrel and operated by said rod in longitudinal movements thereof to impart such radial movements to said punch, an actuating means for shifting said clamping members to said clamping position, and a common operating means connected to both actuating means to clamp said clamping means and thereafter to operate said rod.

4. In an apparatus for forming radial projections on tubular members, a bracket, an elongated hollow mandrel supported at one end on said bracket and projecting therefrom to afford an outboard end onto which such a tubular member may be loaded by endwise mounting movement into a working position in a predetermined longitudinal relation on such mandrel, a clamping means mounted for shifting movement laterally of said mandrel and near the outboard end thereof and movable between a laterally retracted position and an inner clamping position, the retracted position affording clearance for mounting movement of a tubular member, and said clamping position being such as to engage said clamping means with the outer surface of such a tubular member, said clamping means having a die cavity formed therein so as to be disposed opposite the tubular member, a forming punch mounted within said mandrel for radial movement toward and away from said die cavity, an operating rod extended through said mandrel and toward said outboard end, an actuating means for said operating rod, means within said mandrel and operated by said rod in longitudinal movements thereof to impart such radial movements to said punch, an actuating means for shifting said clamping means to said clamping position, and common operating means connected to both actuating means, the space between said operating rod and the actuating means therefor providing sufficient clearance, whereby the actuating means for shifting the clamping members into clamping position is operated in advance of the means for actuating the operating rod to advance the punch.

5. In an apparatus for forming projections on tubular members, a bracket, an elongated hollow mandrel supported at one end on said bracket and projecting therefrom to afford an outboard end onto which such a tubular member may be loaded by endwise mounting movement into a working position in a predetermined longitudinal relation on such mandrel, a pair of pivoted clamping members mounted for shifting movement laterally of said mandrel and near the outboard end thereof and movable between laterally retracted positions and inner clamping positions, the retracted positions affording clearance about said mandrel for mounting movement of a tubular member, and said clamping position being such as to engage said clamping members with opposite outer surfaces of such a tubular member, one of said clamping members having a die cavity formed therein so as to be disposed opposite the tubular member, a forming punch mounted within said mandrel for radial movement toward and away from said die cavity, an operating rod extended through said mandrel and toward said outboard end, an actuating means for said operating rod, means within said mandrel and operated by said rod in longitudinal movements thereof to impart such radial movements to said punch, spring means urging said rod to a punch-retracting position, spring means urging said clamping members to their retracted positions, a cam member shiftable longitudinally along said clamping members for moving the same to said clamping position, an actuating means for said cam and common operating means connected to both actuating means, the space between said operating rod and the actuating means therefor providing sufficient clearance, whereby the actuating means for shifting the clamping members into clamping position is operated in advance of the means for actuating the operating rod to advance the punch.

6. The structure as set forth in claim 5 wherein the clamping members have on the outer faces thereof a cam surface engageable by the cam member to shift the clamping members to clamping position, and dwell surfaces thereon to allow the further movement of the actuating means for the clamping members.

7. In an apparatus for forming projections on tubular members, a bracket, an elongated hollow mandrel supported at one end on said bracket and projecting therefrom to afford an outboard end onto which such a tubular member may be loaded by endwise mounting movement into a working position in a predetermined longitudinal relation on such mandrel, clamping means mounted for shifting movement laterally of said mandrel and near the outboard end thereof and movable between a laterally retracted position and an inner clamping position, the retracted position affording clearance for mounting movement of a tubular member, and said clamping position being such as to engage said clamping means with the outer surface of such a tubular member, said clamping means having a die cavity formed therein so as to be disposed opposite the tubular member, a forming punch mounted within said mandrel for radial movement toward and away from said die cavity, a first operating rod extended through said mandrel and toward said outboard end, actuating means for said operating rod, means within said mandrel and operated by said rod in a longitudinal movement thereof in one direction to impart such radial movements to said punch, spring means urging said rod to a punch-retracting position, spring means urging said clamping means to its retracted position, means including a pair of operating rods operable in movement in said one direction to shift said clamping means to its clamping position, an actuating means for said pair of operating rods, and common operating means connected to both actuating means, the space between said operating rod and the actuating means therefor providing sufficient clearance, whereby the actuating means for shifting the clamping members into clamping position is operated in advance of the means for actuating the operating rod to advance the punch.

8. In an apparatus for forming projections on tubular members, a bracket, an elongated hollow mandrel supported at one end on said bracket and projecting therefrom to afford an outboard end onto which such a tubular member may be loaded by endwise mounting movement into a working position in a surrounding and predetermined longitudinal relation on such mandrel, a pair of pivoted clamping members mounted for shifting movement laterally of said mandrel and near the outboard end thereof and movable between a laterally retracted position and an inner clamping position, the retracted position affording clearance for mounting movement of a tubular member, said clamping position being such as to engage said clamping members with the opposite outer surfaces of such a tubular member, actuating means for shifting said clamping members to clamping position, one of said clamping members having a die cavity formed therein so as to be disposed opposite the outer surface of the tubular member, a forming punch mounted within said mandrel for radial movement toward and away from said die cavity, punch operating means within said mandrel and operable in longitudinal movements thereof to impart such radial movements to said punch, actuating means for said last mentioned means, and common operating means connected to both actuating means, the space between said operating rod and the actuating means therefor providing sufficient clearance, whereby the actuating means for shifting the clamping members into clamping position is operated in advance of the means for actuating the operating rod to advance the punch.

9. In an apparatus for forming projections on tubular members, a bracket, an elongated hollow mandrel supported at one end on said bracket and projecting therefrom to afford an outboard end onto which such a tubular member may be loaded by endwise mounting movement into a working position in a surrounding and predetermined longitudinal relation on such mandrel, a stop means engaging said mandrel comprising a segmental head adjacent the mandrel and swingably and slidably mounted upon a rod supported by said bracket longitudinally of said mandrel and adapted to be engaged by the tubular member to limit endwise movement thereof, a pair of clamping members pivoted transversely to the axis of said mandrel and mounted for shifting movement laterally of said mandrel and near the outboard end thereof and movable between a laterally retracted position and an inner clamping position, the retracted position affording clearance for mounting movement of a tubular member, said clamping position being such as to engage said clamping members with the outer surface of such a tubular member, one of said clamping members having a die cavity formed therein so as to be disposed opposite the outer surface of the tubular member, a forming punch mounted within said mandrel for radial movement toward and away from said die cavity, and means within said mandrel and operated by longitudinal movements thereof to impart such radial movements to said punch.

10. In an apparatus for forming radial protuberances on tubular members comprising a bed plate, a bracket on said bed plate, a mandrel supported on said bed plate, clamping means pivotally mounted on said bracket, actuating means moving relative to the clamping means to shift said clamping means into clamping position, an operating rod mounted within said mandrel and movable relative thereto, a punch member mounted within the mandrel and actuated by the operating rod to be projected into operation, actuating means for the operating rod, and common operating means connected to both actuating means, the space between said operating rod and the actuating means therefor providing sufficient clearance, whereby the actuating means for shifting the clamping members into clamping position is operated in advance of the means for actuating the operating rod to advance the punch.

11. The structure as defined in claim 10 in which the clamping means has a cam surface thereon which is first engaged by the actuating means therefor to shift the same into clamping position and a dwell surface thereon to maintain the same in clamping position and allow further movement of the common operating means and the operating rod actuating means.

CHARLES W. HARRISON.

References Cited in the file of this patent

UNITED STATES PATENTS

| Number | Name | Date |
|---|---|---|
| 1,039,948 | Hunter | Oct. 1, 1912 |
| 1,432,073 | Lowy | Oct. 17, 1922 |
| 1,962,543 | Wilson | June 12, 1934 |